United States Patent
Fujita

[11] Patent Number: 5,879,609
[45] Date of Patent: Mar. 9, 1999

[54] METHOD AND APPARATUS FOR FORMING SEAL PORTION OF LAMINATED ALUMINUM TUB

[75] Inventor: Mamoru Fujita, Kohtu-ku, Japan

[73] Assignee: Yoshino Kogyosho Co., Ltd., Tokyo, Japan

[21] Appl. No.: 750,386

[22] PCT Filed: Apr. 26, 1996

[86] PCT No.: PCT/JP96/01150

§ 371 Date: Jan. 22, 1997

§ 102(e) Date: Jan. 22, 1997

[87] PCT Pub. No.: WO96/33912

PCT Pub. Date: Oct. 31, 1996

[30] Foreign Application Priority Data

Apr. 28, 1995 [JP] Japan .................................. 7-105061

[51] Int. Cl.⁶ .............................. B65B 7/14; B65B 51/10
[52] U.S. Cl. ...................... 264/248; 53/373.7; 53/373.8; 53/479; 264/322; 264/DIG. 41
[58] Field of Search ............................ 156/308.4, 309.6, 156/581, 583.1; 264/DIG. 41, 248, 322; 53/477, 479, 373.7, 373.8

[56] References Cited

U.S. PATENT DOCUMENTS

| | | | |
|---|---|---|---|
| 2,028,112 | 1/1936 | Westin | 264/DIG. 41 |
| 2,562,523 | 7/1951 | Brunet | 264/DIG. 41 |
| 3,063,890 | 11/1962 | Saumsiegle | 156/308.4 |
| 5,672,308 | 9/1997 | Fujita | 264/DIG. 41 |

FOREIGN PATENT DOCUMENTS

| | | |
|---|---|---|
| 53-46138 | 12/1978 | Japan . |
| 61-93029 | 5/1986 | Japan . |
| 61-59962 | 12/1986 | Japan . |
| 63-126721 | 5/1988 | Japan . |
| 1-28001 | 8/1989 | Japan . |
| WO95/27656 | 10/1995 | WIPO . |

*Primary Examiner*—Daniel Stemmer
*Attorney, Agent, or Firm*—Oliff & Berridge, PLC

[57] ABSTRACT

The synthetic resin at a projecting end portion (5) projected from a clamping device (9) is heated to melt, then the projecting end portion (5) is positioned in a press molding space, which comprises an opening between an aluminum foil layer (3c) of a laminated aluminum tube and a molding wall of the press molding space. The projecting end portion (5) is pressed and molded into a sealed portion in the press molding space. The tube produced with this method has a sealed portion (8) with a desired shape, the aluminum foil layer (3) at the sealed portion (8) being completely covered and encapsulated with the synthetic resin, and the density of the sealed portion (8) improves providing excellent sealing quality.

4 Claims, 6 Drawing Sheets

METHOD AND APPARATUS FOR FORMING SEAL PORTION OF LAMINATED ALUMINUM TUB

BACKGROUND OF THE INVENTION

1. Field of Invention

This invention relates to a forming method for a seal portion of laminated aluminum tubes, in which the seal portion, one end of the tube, is flattened, melted and formed into a certain shape. This invention also relates to an apparatus for forming a seal portion of laminated aluminum tubes.

2. Description of Related Art

In the past, a seal portion of synthetic resin made tube-type containers, the main body thereof is made of a laminated aluminum tube, is generally formed in such way that, first, an end portion, which comprises a cave and naturally opens to the air, is clamped and flattened by a clamp device. Then a projecting end portion, which is a portion protruded from the clamp device, is heated and melted by a heater. At last, the melted projecting end portion is simply pressed by a pair of sealing metal clamps into a closed flat shape.

According to the prior art described above, the sealing metal clamps are such that they are only capable of pressing the melted projecting end portion, but they cannot control the melted synthetic resin to flow to certain directions. Therefore, the sealing metal clamps according to the prior art cannot form the seal portion into a desired shape.

That is, according to the prior art, the sealing metal clamps only press the melted synthetic resin at the projecting end portion, so that, as shown in FIG. 8, the melted synthetic resin partly protrudes toward the side directions and produces sharp shaped burrs. Users are often bothered by such containers as the burrs scratch his/her fingers or the like and hurt them.

Further, since the sealed portion is formed into a final shape by being simply clamped by the sealing metal clamps, the final shape thereof is limited to such shape as shown in FIG. 8 or the like. And, the sealed portion cannot be formed into any other desired unique shape or any other useful shape which, for example, enables it to comprise a portion such as a hook for placing it on a hanger. The container according to the prior art is not satisfactory enough because the final shape thereof is limited.

Further, in the sealed portion of a tube of the prior art, as the projecting end portion is heated to melt, an aluminum foil layer thereof is partly exposes to the air. Since the projecting end portion is simply pressed and formed into a final shape, the aluminum foil layer 3c is not fully covered with the synthetic resin. It continues to be exposed partially in the air as shown in FIG. 8. The exposed aluminum foil layer corrodes, and the outer periphery of the sealed portion deteriorates, also depreciating the leak resistance of the sealed portion.

Therefore, the object of the present invention is to resolve such problems and to form a sealed portion of laminated aluminum tubes into a desired shape, to form an outer periphery of the sealed portion with an attractive shape, and to cover the aluminum foil layer completely with the synthetic resin.

SUMMARY OF THE INVENTION

In order to achieve the object, a forming method of a sealed portion of laminated aluminum tubes according to the present invention comprises the following steps. First, clamp an end portion of a laminated aluminum tube flat by a pair of clamps. Second, heat and melt synthetic resin material at a projecting end portion, which is a portion projected from the clamp device. Finally, press the melted projecting end portion and mold into a desired shape of a sealed portion in a press mold space. The press mold space creates an opening between an aluminum foil at the projecting end portion and the mold wall, into which melted synthetic resin at the projecting end portion flows.

Prior to pressing and molding the projecting end portion into the sealed portion, it is desired that both edge corners of the edge of the projecting end portion should be removed by either folding them inside or cutting.

An apparatus for forming the sealed portion of a laminated aluminum tube according to the invention comprises a pair of clamps (clamp device), a heater and a press molding device. The clamp device clamps and flattens the end portion of a laminated aluminum tube.

The heater heats and melts the synthetic resin material at the projecting end portion of the end portion. The projecting end portion is a portion being projected from the clamp device. The press molding device presses the projecting end portion while the synthetic resin material at the projecting end portion is being melted and molds it into a desired shape.

The press molding device may be provided with a concave jig and a convex jig. The concave jig is capable of sliding over one of the clamps of the clamp device in the directions the press molding device moves to press the end portion. The concave jig has a concave shaped molding wall, and the width thereof is similar to or a little wider than that of the projecting end portion. The convex jig is capable of sliding over the other clamp of the clamp device along the same axis as the concave jig moves. It has a convex shaped molding wall. The convex wall is inserted into the concave molding wall of the concave jig so tightly that no burrs are produced between the molding walls.

The function of the invention will be described below.

According to the method invention, the end portion of a tube is clamped from its front and back by a pair of clamps (a clamp device), each of which comprises a flat pressing surface, and is formed into a flat shape. Then the projecting end portion projected out of the clamp device is heated by a heater.

As the projecting end portion is heated by the heater, the synthetic resin at the projecting end portion melts but an aluminum foil layer at the same projecting end portion does not melt. Thus, the melted synthetic resin deforms and sticks around the straight edged aluminum foil layer.

After completion of the heating process of the projecting end portion by the heater and while the synthetic resin material at the projecting end portion is still in melted condition, the projecting end portion is positioned into a molding space formed by a combination of a concave jig and a convex jig. By being pressed by the jigs, the projecting end portion is molded into a desired shape, and it is cooled in order to complete the sealed portion.

During the press molding of the projecting end portion into the sealed portion, a desired shape of the molding space formed by a combination of the concave jig and the convex jig is arranged such that it comprises the required size and shape to allow the melted synthetic resin at the projecting end portion to flow and fill an opening created between the mold wall of the jigs and the aluminum foil layer. Therefore, by simply pressing the projecting end portion with the jigs, the synthetic resin material at the projecting end portion is able to flow around the aluminum foil layer in the molding space, filling the space between the molding wall and the aluminum foil layer. As a result, the outer shape of the sealed portion is decided according to the shape of the molding space formed by the jigs, and the aluminum foil layer is totally covered by the synthetic resin.

Further, the projecting end portion is pressed and molded into the sealed portion in the molding space, which is a closed space, without being a so-called short mold, so that the sealed portion is formed as the projecting end portion is pressed hard enough, and the synthetic resin material at the sealed portion highly improves in its density. (A short mold in this case means that insufficient synthetic resin is provided to fill a molding space, so that the aluminum foil cannot be fully covered with synthetic resin.) Therefore, the mechanical strength of the sealed portion improves, and so does the adherence strength of the synthetic resin material at the sealed portion.

By removing both edge corners of the projecting end portion by folding or cutting them prior to seal molding the projecting end portion into the sealed portion, the projecting degree of the aluminum foil layer at the edge corners is greatly reduced, so that the press molding space formed by the mold jigs can be shaped more freely, and the corners of the projecting end portion are prevented from being pressed by the molding device, which improves the safety of the forming process.

BRIEF DESCRIPTION OF THE DRAWINGS

FIGS. 1(a) and 1(b) show an end portion of a laminated aluminum tube, wherein FIG. 1(a) shows a top view thereof, and FIG. 1(b) shows an elevational view thereof.

FIGS. 3(a) and 3(b) show a clamping process of an end portion of a tube of a preferred embodiment according to the invention, wherein FIG. 3(a) shows a top view thereof, and FIG. 3(b) shows an elevational view thereof.

FIGS. 6(a) and 6(b) show a press mold process of a preferred embodiment according to the invention, wherein FIG. 6(a) shows a top view thereof, and FIG. 6(b) shows an elevational view thereof.

DETAILED DESCRIPTION OF PREFERRED EMBODIMENTS

A preferred embodiment according to the invention will be described below referring to FIG. 1 to FIG. 7.

Figure 1A:
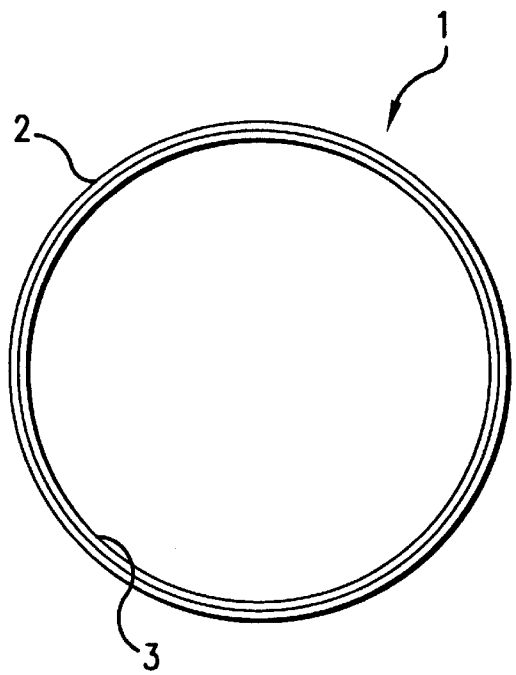
Figure 1B:
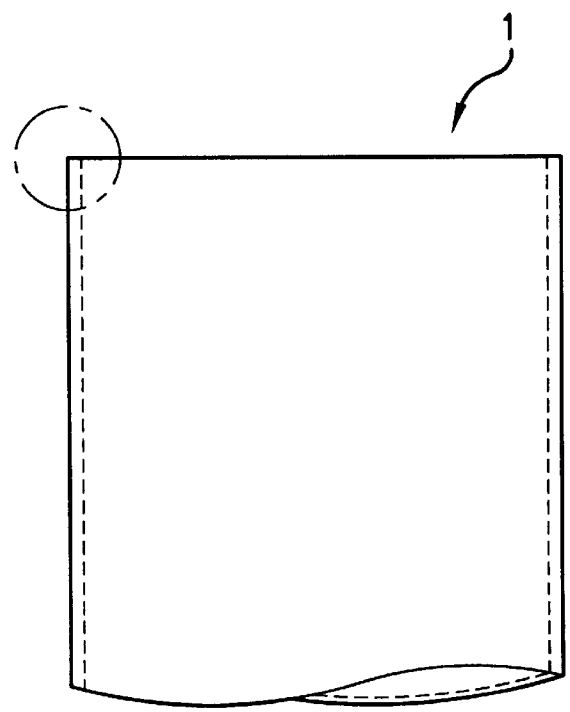
Figure 2:
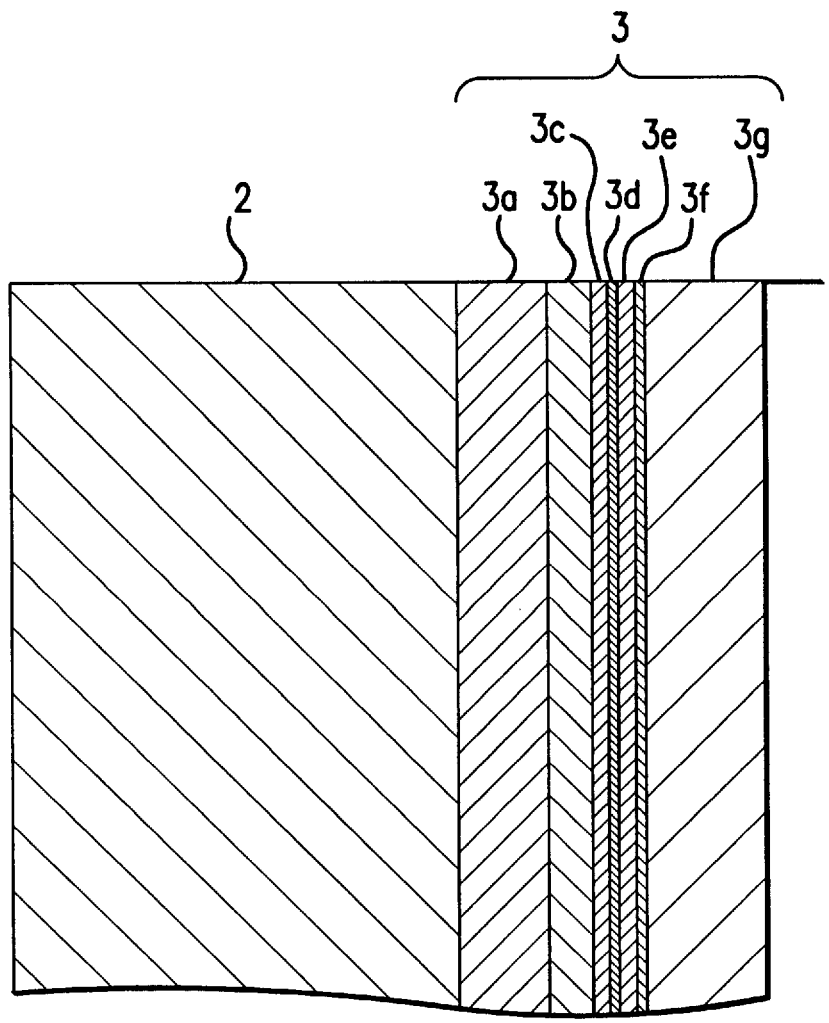
FIG. 2 shows an enlarged sectional view of an example of plural layers of the tube shown in FIG. 1.

FIG. 1(a) shows a top view of an aluminum laminated tube 1, and FIG. 1(b) shows an end area of the tube 1 including an end portion 4. This tube 1, as shown in FIG. 2, is composed of plural layers, which include an outer film 2 which is thicker and located outside and a thinner laminated aluminum film 3 located inside.

The laminated aluminum film 3 is composed of from its outer surface a nonrigid polyethylene made outer layer 3a, which is white, a nonrigid polyethylene made extrusion laminated layer 3b, which has its natural color and is adhesive, an aluminum foil layer 3c of Japanese Industrial Standard product, a polyurethane made first dry laminated layer 3d, a polyethylene terephthalate made aggregate layer 3e, which mechanically strengthens the laminated aluminum film 3, a polyurethane system made second dry laminated layer 3f, and a nonrigid polyethylene made inner layer 3g, which structures the inner surface of the laminated aluminum film 3.

Figure 3A:
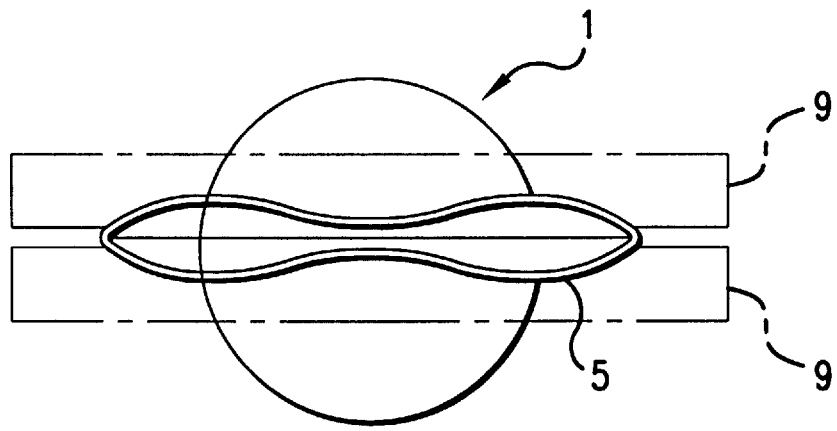
Figure 3B:
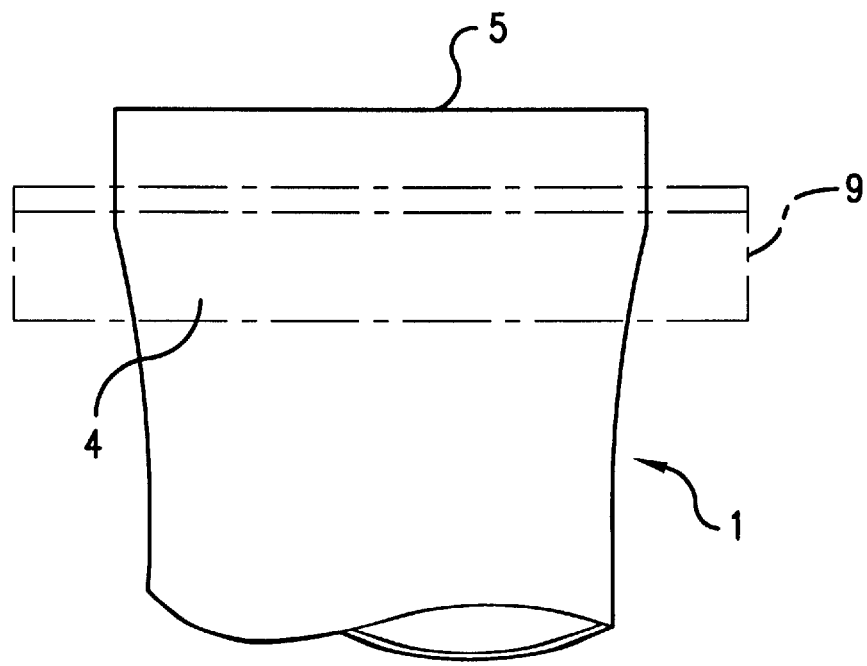
Figure 4:
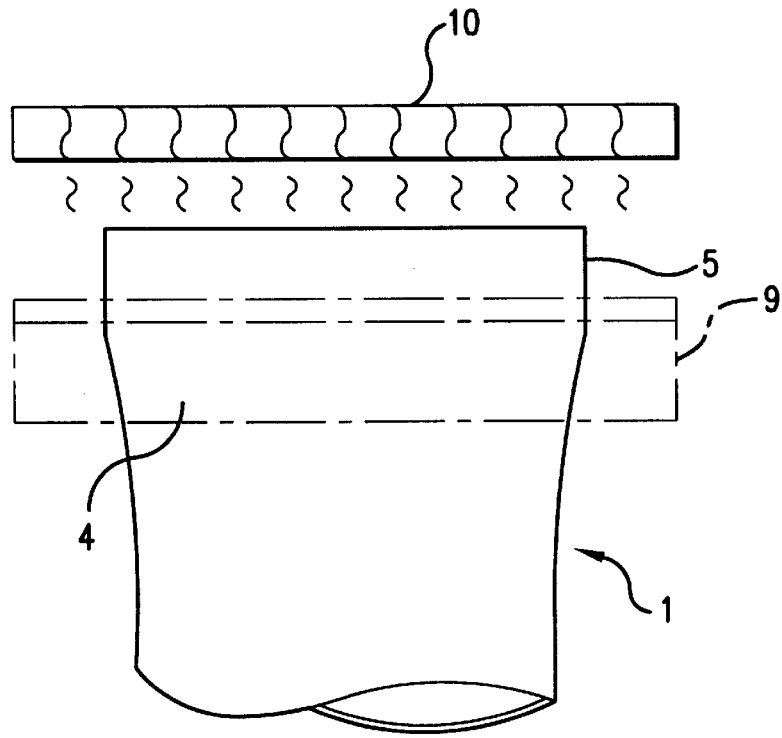
FIG. 4 shows an elevational view of a heating process of a preferred embodiment according to the invention.

By clamping the end portion 4 of the tube 1 into a flat shape by a pair of clamps (a clamp device) 9, as shown in FIG. 3, as the projecting end portion 5 projects from the clamp device 9, the projecting end portion 5 slightly opens its edge portion as shown in FIG. 3(a), and it is flattened as such that its width is almost as wide as the flattened end portion 4 as shown in FIG. 3(b).

Then, the projecting end portion 5 of the tube 1 is heated mainly by heat radiation of a heater 10 from above while the projecting end portion 5 is still being clamped by the clamp device 9 until the synthetic resin material of the tube 1 melts.

Figure 5:
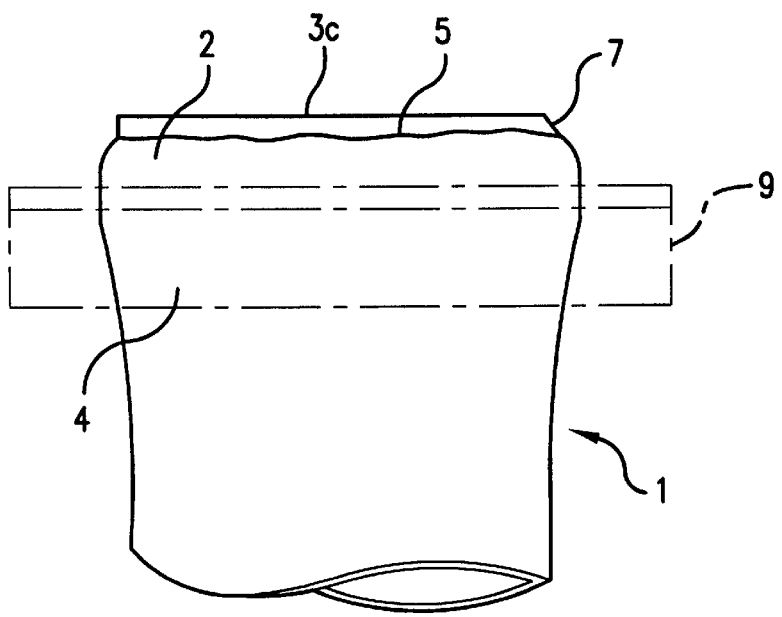
FIG. 5 shows an elevational view of a projecting end portion right after its completion of the heating process of a preferred embodiment according to the invention.

By this heating process with the heater 10, the synthetic resin at the projecting end portion 5 is half melted, so that it tends to draw downward and deform by an effect of the gravity. However, since the aluminum foil layer 3c still keeps its own shape, the synthetic resin at the projecting end portion 5 does not fully draw down as it tends to cohere to the foil layer 3c. Thus, as shown in FIG. 5, it only draws down a little.

The heating process of the projecting end portion 5 by the heater 10 should be decided as such that time and temperature of heating the synthetic resin of the tube 1 are decided based on the nature and the structure of the resin. In general, the top edge portion of the projecting end portion 5 is heated for 8 to 10 seconds until the temperature thereof raises to 180° C. to 250° C.

Figure 6A:
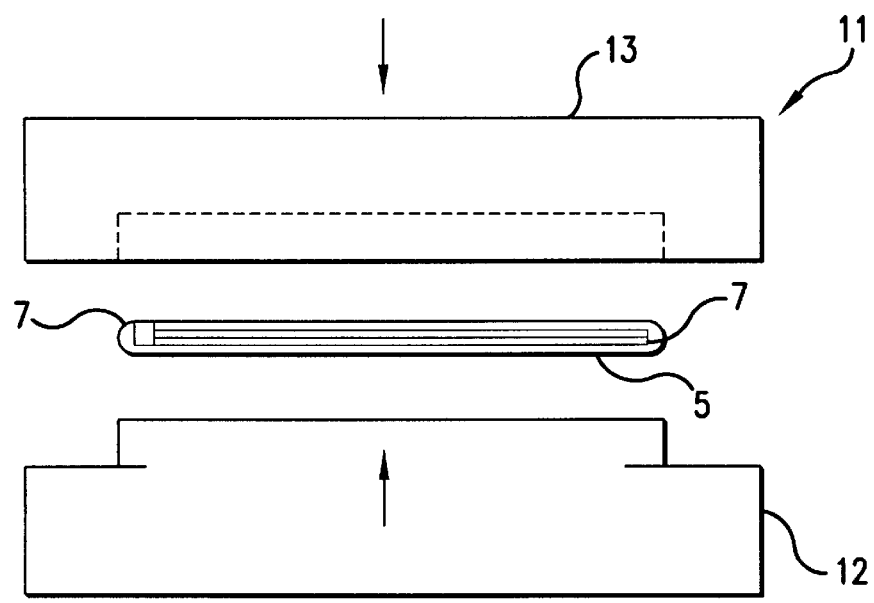
Figure 6B:
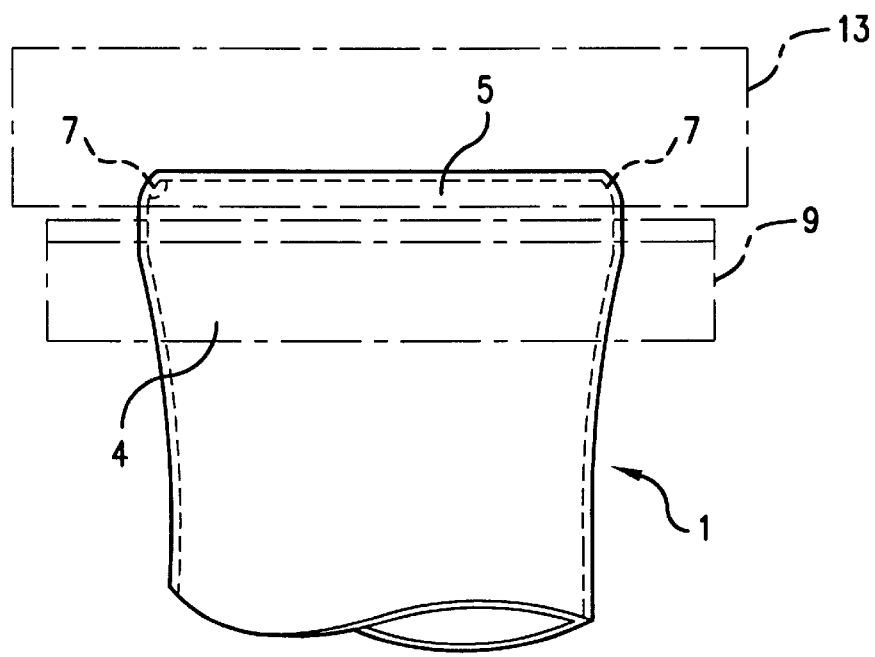

After completion of the heating process of the projecting end portion 5 by the heater 10, as shown in FIG. 6, the projecting end portion 5 being clamped by the clamp device 9 is secured into a press molding device 11, and it is promptly pressed and molded by the press molding device 11 into a desired shape of a sealed portion 8.

The press molding device 11 comprises a concave jig 13 and convex jig 12. The concave jig 13 is capable of sliding in the direction that the press molding device 11 moves to press the projecting end portion 5 above one of the clamps 9. The concave jig 13 is provided with a concave shaped molding wall facing toward the projecting end portion 5. The molding wall is as wide as or slightly wider than the projecting end portion 5. The convex jig 12 is capable of sliding over the other one of the clamps 9 in the direction that the press molding device 11 moves to press the projecting end portion 5. The convex jig 12 is provided with a convex shaped molding wall which airtightly secures into the concave shaped molding wall of the concave jig 13 as such that no burrs are produced around the sealed portion 8 while it is molded.

In case of the preferred embodiment shown in the drawings, the molding space formed by a combination of the convex jig 12 and the concave jig 13 is arranged as wide as the flattened end portion 4, and the top surface of the molding space is arranged flat, and both corners thereof are shaped in circular arc 7.

The molding space formed by the concave jig 13 has a size and shape arranged so that when the projecting end portion 5 is positioned into the molding space, there is provided an opening between the molding wall and the edge portion of the aluminum foil layer 3c of the projecting end portion 5, in which melted synthetic resin flows and remains. The aluminum foil layer 3 at the projecting end portion 5 neither flows nor deforms, so that the substantial molding space provided around the projecting end portion is an opening formed between the molding wall of the press molding device 11 and the aluminum foil layer 3c.

When the projecting end portion 5 is pressed, cooled and molded into the sealed portion 8, the projecting end portion 5 is stressed with a force of about 30 kgf. By this, a cubic volume of the sealed portion 8 becomes about 0.65~0.80 times as large as that of the projecting end portion 5. To successfully achieve this, the press molding device 11 includes a function that the pressing stroke thereof is changeable.

Time required for press molding the projecting end portion 5 into the sealed portion 8 by the press molding device 11 is about 0.5 seconds. The synthetic resin at the sealed portion 8 is cooled down to the temperature of 60° C.~80° C. while it is pressed and molded into the sealed portion 8. After being released from the press molding device 11, the sealed portion 8 is further cooled down to the normal temperature by a process wherein it is blown with air.

Figure 7:
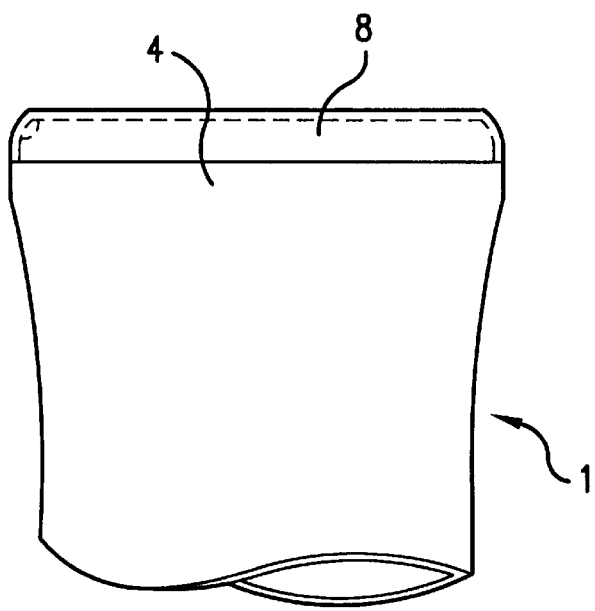
FIG. 7 shows an elevational view of an outer periphery of a sealed portion of a preferred embodiment according to the invention.
Figure 8:
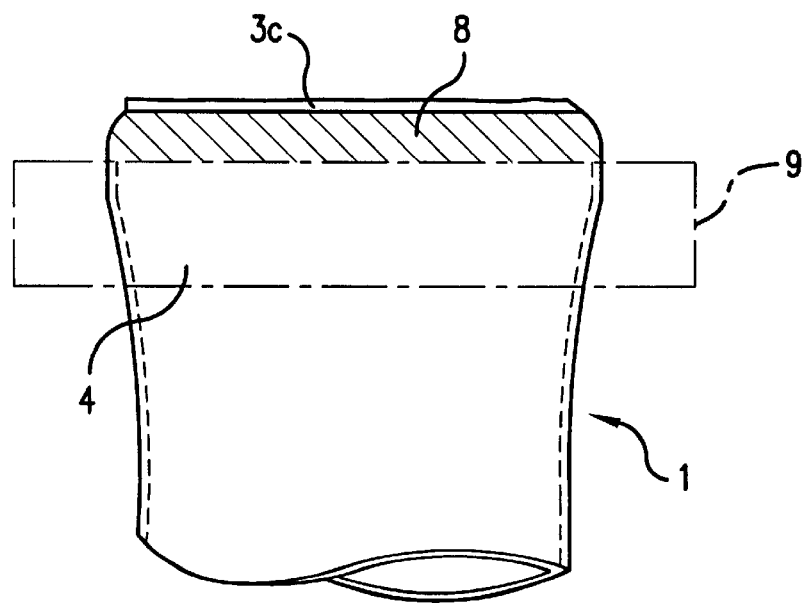
FIG. 8 shows an elevational view of an outer periphery of a prior art.

FIG. 7 shows a front elevation view of an outer periphery of the sealed portion 8 formed by the press molding device 11, which is shown in FIG. 6. The sealed portion 8 does not protrude to either side of the end portion 4: the edge line is smooth; both corners are cut such that they are shaped in circular arc form; and the top edge is shaped straight and flat. Since a substantial molding space is created between the molding wall of the press molding device 11 and the aluminum foil layer 3c at the projecting end portion 5, the aluminum foil layer 3c at the sealed portion 8 is fully and completely covered by the synthetic resin.

The preferred embodiment shown in FIG. 7 is formed such that prior to seal molding the projecting end portion 5 into the sealed portion 8, both edge corners of the end portion 5 are shaped in edge cut forms 7 for the purpose of removing the aluminum foil layer at the same corners by folding or simply cutting them. By doing so, the edge corners of the sealed portion 8 can be shaped in circular arc forms 7 with a rather long radius. Since the edge corners of the sealed portion 8 are formed in circular arc forms, the molding space can be minimized and a so-called short mold can be prevented while the sealed portion 8 is formed.

Although, in the preferred embodiment, the edge cutting process of the corners 6 of the projecting end portion 5 by folding or cutting them is completed prior to press molding the projecting end portion 5 into the sealed portion 8, it should not be limited so. In case the cut edge 7 is formed by folding the corners 6, it should be completed when the synthetic resin at the projecting end portion 5 has lost its rigidity, that is the time right after the projecting end portion 5 is heated.

While press molding the projecting end portion 5 into the sealed portion 8, the synthetic resin material flows and covers the aluminum foil layer 3c. The synthetic resin forms an outer periphery of the sealed portion 8. This synthetic resin is mainly composed of an outer film 2, an outer layer 3a made of laminated aluminum film and a laminated film 3b. The total thickness of the synthetic resin material is 75~77% of that of the tube 1. Since the tube 1 is composed of a higher percent of synthetic resin material, a short mold will not occur when press molding the projecting end portion 5 into the sealed portion 8. However, in case the edge cut 7 is not formed, or the molding space created between the aluminum foil layer 3a at the projecting end portion 5 and the molding wall of the press molding device 11 is arranged larger to form a desired shape of the sealed portion 8, the outer film 2 should be thickened. (It is preferred that the thickness of the outer film 2 should be limited below about 500μ to not excessively diminish the flexibility of the tube 1.)

INDUSTRIAL UTILIZATION

The invention is structured as described above, so that it possesses the following industrial utilization.

The press molding space, in which a projecting end portion is formed into a sealed portion, has a desired shape, so that an outer periphery of the sealed portion can be formed into the desired shape accordingly, and a tube, which is the final product of the invention, can be shaped into a desired shape. This increases the value of the tube.

The press molding space can be arranged into a desired shape, so that an outer periphery of the sealed portion can be shaped as such that it is so smooth that it does not catch on anything such as users' fingers, and a desired type of tube that is easy and safe to use can be provided.

The press molding space, which forms the projecting end portion into the sealed portion, can be shaped as desired, so that an outer periphery of the sealed portion can be formed into any desired unique shape, and good looking and unique shaped tubes with high value can be produced.

The sealed portion is formed such that an aluminum foil layer at the sealed portion is fully and assuredly covered with synthetic resin material, so that the edge of the aluminum foil layer is also rigidly covered with the synthetic resin material, and the aluminum foil layer at the sealed portion does not corrode. This provides a tube wherein the sealed portion thereof retains its rigid sealing function for a longer period of time.

The sealed portion is formed in the press molding space, which is a closed space, by being pressed with strong force, so that the synthetic resin at the sealed portion is also pressed hard, thus increasing its density, and that the sealing strength of the sealed portion improves. This can provide a tube with the sealing quality thereof being excellent.

I claim:

1. A method for forming a sealed portion of a laminated aluminum tube, comprising the steps of:

clamping and flattening an end portion of a laminated aluminum tube with a clamping device, said end portion projecting outwardly from said clamping device;

heating and melting said projecting end portion; and pressing and molding said projecting end portion into a sealed portion having a desired shape in a press molding space defined between molding walls of a jig, said press molding space including a space between an outer edge of an aluminum foil layer of said laminated aluminum tube at said projecting end portion and a molding wall of said jig, said space between said outer edge and said molding wall forming an opening into which melted synthetic resin produced from portions of said laminated aluminum tube during said heating and melting step at said projecting end portion flows in order to completely encase said outer edge of said aluminum foil layer with said synthetic resin.

2. The method for forming a sealed portion of a laminated aluminum tube according to claim 1, wherein prior to pressing and molding said projecting end portion into said sealed portion, edge corners of said projecting end portion are formed to smooth contoured edges by either folding or cutting the edge corners.

3. An apparatus for forming a sealed portion of a laminated aluminum tube comprising:

- a clamping device for clamping an end portion of a laminated aluminum tube and flattening said end portion, said clamping device including a pair of clamps;
- a heater for heating a projecting end portion of said laminated aluminum tube being projected outwardly from said clamping device and melting synthetic resin material produced from portions of said laminated aluminum tube at said projecting end portion; and
- a press molding device for pressing and molding said projecting end portion and the melted synthetic resin into a sealed portion having a desired shape, with said press molding device having molding walls shaped to define a press molding space providing sufficient clearance around an outer edge of an aluminum foil layer of said laminated aluminum tube such that the melted synthetic resin completely encapsulates the outer edge of the aluminum foil layer.

4. The apparatus for forming a sealed portion of a laminated aluminum tube according to claim 3, wherein said press molding device comprises:

- a concave jig capable of sliding in a direction said press molding device moves to press said tube, a front surface of said concave jig pressing against said projecting end portion and forming a concave shaped molding wall, said concave shaped molding wall being as wide as or a little wider than said projecting end portion; and
- a convex jig capable of sliding in the direction said press molding device moves to press said tube, a front surface of said convex jig pressing against said projecting end portion and forming a convex shaped molding wall, portions of said convex shaped molding wall fitting tightly into said concave shaped molding wall of said concave jig (13) so that no burrs are produced.

* * * * *

UNITED STATES PATENT AND TRADEMARK OFFICE
CERTIFICATE OF CORRECTION

PATENT NO. : 5,879,609
DATED : March 9, 1999
INVENTOR(S) : Mamoru FUJITA

It is certified that error appears in the above-identified patent and that said Letters Patent is hereby corrected as shown below:

On title page, item [54] and col. 1, line 3, change "TUB" TO --TUBE--.

Signed and Sealed this

Tenth Day of August, 1999

Attest:

Q. TODD DICKINSON

Attesting Officer

Acting Commissioner of Patents and Trademarks